(12) United States Patent
Ukita et al.

(10) Patent No.: US 8,567,319 B2
(45) Date of Patent: Oct. 29, 2013

(54) GAS GENERATOR

(75) Inventors: Shinichiro Ukita, Hyogo (JP); Teppei Hanano, Hyogo (JP)

(73) Assignee: Daicel Corporation, Osaka-shi (JP)

( * ) Notice: Subject to any disclaimer, the term of this patent is extended or adjusted under 35 U.S.C. 154(b) by 0 days.

(21) Appl. No.: 13/344,372

(22) Filed: Jan. 5, 2012

(65) Prior Publication Data

US 2012/0174815 A1 Jul. 12, 2012

Related U.S. Application Data

(60) Provisional application No. 61/430,777, filed on Jan. 7, 2011.

(30) Foreign Application Priority Data

Jan. 6, 2011 (JP) .................................. 2011-001112

(51) Int. Cl.
  *C06D 5/00* (2006.01)
  *B60R 21/26* (2011.01)

(52) U.S. Cl.
  USPC .......................................... 102/530; 280/741

(58) Field of Classification Search
  USPC ............................ 102/530, 531; 280/736, 741
  See application file for complete search history.

(56) References Cited

U.S. PATENT DOCUMENTS

| | | | |
|---|---|---|---|
| 5,458,371 A * | 10/1995 | Fulmer et al. | 280/741 |
| 5,466,420 A * | 11/1995 | Parker et al. | 422/164 |
| 6,234,521 B1 | 5/2001 | Katsuda et al. | |
| 7,665,764 B2 * | 2/2010 | Matsuda et al. | 280/741 |
| 2005/0200107 A1 | 9/2005 | Matsuda et al. | |

FOREIGN PATENT DOCUMENTS

| | | |
|---|---|---|
| EP | 1 241 153 A1 | 9/2002 |
| JP | 5-139239 A | 6/1993 |
| JP | 10-119705 A | 5/1998 |
| JP | 10-297415 A | 11/1998 |
| JP | 2001-213688 A | 8/2001 |
| JP | 2005-199867 A | 7/2005 |
| WO | WO 0138266 A1 * | 5/2001 |

OTHER PUBLICATIONS

International Search Report and Written Opinion issued in PCT Application No. PCT/JP2012/050531 on Apr. 23, 2012.

* cited by examiner

*Primary Examiner* — James Bergin
(74) *Attorney, Agent, or Firm* — Birch, Stewart, Kolasch & Birch, LLP

(57) ABSTRACT

A gas generator for a restraining apparatus includes a housing, an inner tube member within the housing, an ignition device on a bottom portion of the housing within the inner tube member, a solid gas generating agent in a combustion chamber, and an adsorbent separated from the solid gas generating agent and stored in a cup-shaped container. The container is provided such that a gap is formed between an opening portion of the container and a ceiling portion of the housing or a member in the housing, and a bottom portion side of the container is inserted such that at least a part of an outer circumferential wall surface of the container directly opposes an inner circumferential wall surface of the inner tube member. At activation, the container is moved by an impact and abuts against the ceiling portion of the housing or the member to close the opening portion.

7 Claims, 7 Drawing Sheets

GAS GENERATOR

This nonprovisional application claims priority under 35 U.S.C. §119 (a) to Patent Application No. 2011-1112 filed in Japan on 6 Jan. 2011, and 35 U.S.C. §119(e) to U.S. Provisional Application No. 61/430,777 filed on 7 Jan. 2011, both of which are incorporated by reference.

FIELD OF THE INVENTION

The present invention relates to a gas generator for a restraining apparatus that is mounted on a vehicle.

BACKGROUND OF THE INVENTION

Pyrotechnic gas generators that use a solid gas generating agent are widely adopted as a gas generator used in a restraining apparatus such as an airbag apparatus mounted on an automobile or the like.

With pyrotechnic gas generators, inventions have been proposed for absorbing and removing hazardous gas produced after activation, moisture in order to protect a gas generating agent from humidity before activation, and components produced by decomposition of a solid gas generating agent before activation.

JP-A No. 5-139239 discloses an invention in which an adsorptive active material for adsorbing hazardous residue produced by combustion of a gas generating agent is held and supported in a filter provided in a gas flow channel of an inflator (disclosed in claims).

JP-A No. 10-297415 presents an embodiment in which a moisture remover for removing moisture produced by combustion of a gas generating agent 5 is arranged inside an upper space S2 between a filter member 7 in a gas generator and an annular cover 25 (disclosed in paragraph 0020).

JP-A No. 2001-213688 discloses an invention in which an adsorbent for adsorbing various radicals produced by decomposition of a gas generating agent is arranged inside a gas generating agent combustion chamber (disclosed in paragraphs 0053 and 0054).

SUMMARY OF THE INVENTION

The present invention 1 provides a gas generator for a restraining apparatus including:

a housing having a gas discharge port, an inner tube member provided inside the housing, an ignition device arranged on a side of a bottom portion of the housing inside the inner tube member, a solid gas generating agent stored in a combustion chamber surrounding the inner tube member, an adsorbent being arranged inside the housing, separated from the solid gas generating agent and stored in a cup-shaped container, the cup-shaped container being arranged such that a gap that enables gas to fluidly communicate inside with outside of the cup-shaped container is formed between an opening portion of the cup-shaped container and a ceiling portion of the housing or a member arranged on the ceiling portion of the housing, and a bottom portion side of the cup-shaped container being inserted such that at least a part of an outer circumferential wall surface of the cup-shaped container directly opposes an inner circumferential wall surface of the inner tube member, and at activation of the gas generator, the cup-shaped container being moved by an impact generated by the ignition device and abutting against the ceiling portion of the housing or the member arranged on the ceiling portion of the housing to close the opening portion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
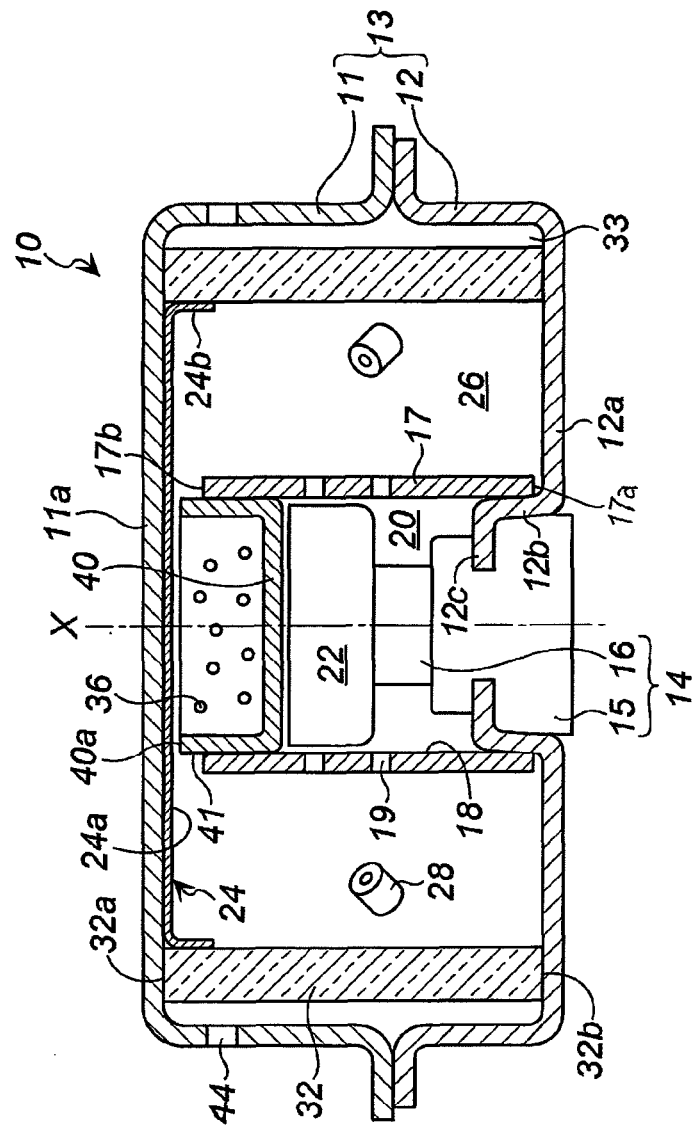
FIG. 1 shows an axial sectional view showing an embodiment of a gas generator according to the present invention (before activation)

The invention 1 includes the following embodiments 2-7:

2. The gas generator for a restraining apparatus according to invention 1, wherein the cup-shaped container is arranged and inserted into the inner tube member such that an entirety of the outer circumferential wall surface of the cup-shaped container directly opposes the inner circumferential wall surface of the inner tube member.

3. The gas generator for a restraining apparatus according to invention 1 or embodiment 2, wherein the cup-shaped container has a flange portion at the opening portion, and the cup-shaped container is provided in the tube member such that the flange portion abuts against a circumferential edge portion of the tube member in a side of the ceiling portion of the housing.

4. The gas generator for a restraining apparatus according to invention 1 or embodiment 2, wherein the cup-shaped container has a flange portion at the opening portion, and the cup-shaped container is provided such that the flange portion abuts against an annular step portion or an annular protruding portion formed inside the inner tube member.

5. The gas generator for a restraining apparatus according to invention 1 or embodiment 2, wherein the cup-shaped container has an annular step portion on a circumferential surface thereof, and the cup-shaped container is provided such that the annular step portion abuts against an annular step portion or an annular protruding portion formed inside the inner tube member.

6. The gas generator for a restraining apparatus according to invention 1 or embodiment 2, wherein the cup-shaped container is provided such that a bottom surface of the cup-shaped container abuts against an annular step portion or an annular protruding portion formed inside the inner tube member.

7. The gas generator for a restraining apparatus according to invention 1 or any one of embodiments 2 to 6, wherein the opening portion of the cup-shaped container is covered by a lid portion having a plurality of communication holes that enables communication of a gas.

The invention according to JP-A No. 5-139239 is intended to adsorb combustion residue. In the invention according to JP-A No. 10-297415, a moisture adsorbent is separated from a combustion chamber by a burst disk 20, and after activation of the gas generator, the adsorbent is brought into contact with components produced by the combustion of the gas generating agent. The adsorbent is arranged in a combustion gas exhaust path to facilitate the contact.

Therefore, it is difficult to adsorb and retain components produced from the gas generating agent before activation of the gas generator as is the case of the invention according to JP-A No. 2001-213688.

In the invention according to JP-A No. 2001-213688, the gas generating agent and the adsorbent are arranged in a continuous space system before activation of the gas generator. This arrangement does not change even after the activation of the gas generator. Therefore, a high-temperature combustion gas and the adsorbent come into contact with each other after the activation of the gas generator.

The present invention provides a gas generator for a restraining apparatus such as an airbag apparatus which is capable of adsorbing moisture inside the gas generator and adsorbing gas that affects to decompose a gas generating agent before activation of the gas generator with an adsorbent arranged inside the gas generator, and which is capable of preventing a combustion gas, generated by the solid gas generating agent, and the adsorbent from coming into contact with each other at the activation of the gas generator.

With the gas generator according to the present invention, because of the absorbent arranged therein, radical components, which is produced from a solid gas generating agent before activation of the gas generator (see JP-A No 2001-213688), are adsorbed and retained, and also, moisture existing inside the gas generator is adsorbed and retained. However, components produced by the activation of the gas generator (see JP-A No. 5-139239 and JP-A No. 10-297415) are not adsorbed and retained.

Moreover, the moisture existing inside the gas generator described above is moisture that has existed in the gas generator in a tiny amount during a manufacturing process of the gas generator.

In the gas generator according to the present invention, the adsorbent is stored in the cup-shaped container.

The cup-shaped container is inserted and arranged in the inner tubular member such that an opening portion side thereof faces a housing ceiling portion and a bottom portion side thereof faces a housing bottom portion.

The opening portion is arranged such that a gap that enables gas to fluidly communicate inside with outside of the cup-shaped container is formed between the opening portion and the ceiling portion of the housing or a member arranged on the ceiling portion of the housing.

The bottom portion side may be inserted such that all of the outer circumferential wall surface of the cup-shaped container and the inner circumferential wall surface of the inner tube member directly oppose each other (in other words, a state in which all of the cup-shaped container is inserted), or may be inserted such that a part of the outer circumferential wall surface of the cup-shaped container and the inner circumferential wall surface of the inner tube member directly oppose each other (in other words, a state in which a part of the cup-shaped container is inserted). In this case, "directly opposed" means both states of contact and separation with a small gap.

Moreover, in a state in which a part of the cup-shaped container is inserted, the remaining outer circumferential wall surface of the cup-shaped container which is not inserted may protrude from the inner tube member toward the housing ceiling portion side.

Since the gas generator according to the present invention before activation is such that gas can fluidly communicate inside with outside of the cup-shaped container, a gas inside the gas generator (in particular, the combustion chamber) and a gas inside the cup-shaped container are able to communicate with each other. Therefore, before activation, the gas inside the gas generator (in particular, the combustion chamber) and the adsorbent inside the cup-shaped container are able to come into contact with each other.

With the gas generator according to the present invention, since all of or a part of the cup-shaped container is inserted into the inner tube member, during activation, the container moves upon receiving an impact created by the ignition device (an igniter or an igniter and a transfer charge or the like) and abuts against the ceiling portion of the housing or a member arranged on the ceiling portion of the housing and causes the gap to close. Therefore, during activation, it can be made more difficult for the combustion gas generated by the combustion of the gas generating agent and the adsorbent in the cup-shaped container to come into contact with each other.

Moreover, all of or a part of the cup-shaped container is inserted into the inner tube member because, as described above, when an impact, produced at the ignition device during activation, is received, the cup-shaped container is moved using the impact. Therefore, in a case where only a part of the cup-shaped container is inserted, ⅓ or more of a height of the cup-shaped container is favorably inserted.

In this case, for example, the member arranged at the housing ceiling portion may be a disk-shaped retainer or a cushion material. The disk-shaped retainer is arranged to abut against the housing ceiling surface, in order to position a tubular filter at the time of providing tubular filter, or to prevent short-passing of combustion gas. The cushion material is for retaining the gas generating agent or the like.

Moreover, since a filter may be omitted depending on the type of the solid gas generating agent used, the retainer itself is to be used when needed.

With the gas generator according to the present invention, a method of arranging, inside the inner tube member, the cup-shaped container storing the adsorbent is not particularly limited and the following arrangements (I) to (VII) may be adopted.

(I) An arrangement in which, when using a known combination of an electric igniter and a transfer charge filled into a pouch-like container made of aluminum or the like as an ignition device in the inner tube member, the transfer charge in the pouch-like container is placed on top of the electric igniter and a cup-shaped container storing an adsorbent is arranged on top of the transfer charge in the pouch-like container. In this case, the transfer charge may be fixed by the igniter and the cup-shaped container.

(II) An arrangement in which the cup-shaped container is provided by press-fitting the cup-shaped container into the inner tube member.

(III) An arrangement that uses a cup-shaped container having a shape in which an outer diameter of an opening portion side is greater than an outer diameter of a bottom surface side, a portion between a bottom surface portion and an opening portion is formed by an annular slope, the outer diameter of the opening portion side is greater than an inner diameter of an inner tube member, and the outer diameter of the bottom surface side is smaller than the inner diameter of the inner tube member, whereby the cup-shaped container is inserted into the inner tube member.

(IV) An arrangement in which the cup-shaped container is provided in a state where a bottom surface of the cup-shaped container abuts against an annular step portion or an annular protruding portion formed inside the inner tube member.

The annular step portion formed inside the inner tube member is a step portion formed by difference in the inner diameter of the inner tube member.

(V) A method in which a cup-shaped container having a flange portion at an opening portion is used and the cup-shaped container is provided such that the flange portion abuts against a circumferential edge portion of an inner tube member in the housing ceiling portion side.

(VI) An arrangement in which a cup-shaped container having a flange portion at an opening portion is used and the cup-shaped container is provided such that the flange portion abuts against an annular step portion or an annular protruding portion formed inside an inner tube member.

The annular step portion formed inside the inner tube member is a step portion formed by difference in the inner diameter of the inner tube member.

(VII) An arrangement in which a cup-shaped container having an annular step portion on a circumferential surface thereof is used and the cup-shaped container is arranged such that the annular step portion abuts against an annular step portion or an annular protruding portion formed inside an inner tube member.

The annular step portion formed on the circumferential surface of the cup-shaped container is a step portion formed by difference in the outer diameter and/or the inner diameter of the cup-shaped container.

The annular step portion formed inside the inner tube member is a step portion formed by difference in the inner diameter of the inner tube member.

In the present invention, the opening portion of the cup-shaped container may be covered with a lid portion having a plurality of communication holes through which gas can communicate.

According to the gas generator of the present invention, before activation, moisture inside the gas generator and radical components created from a solid gas generating agent are adsorbed and retained by an adsorbent arranged inside the gas generator, and during activation, the adsorbent and combustion gas are prevented from coming into contact with each other.

Figure 2:
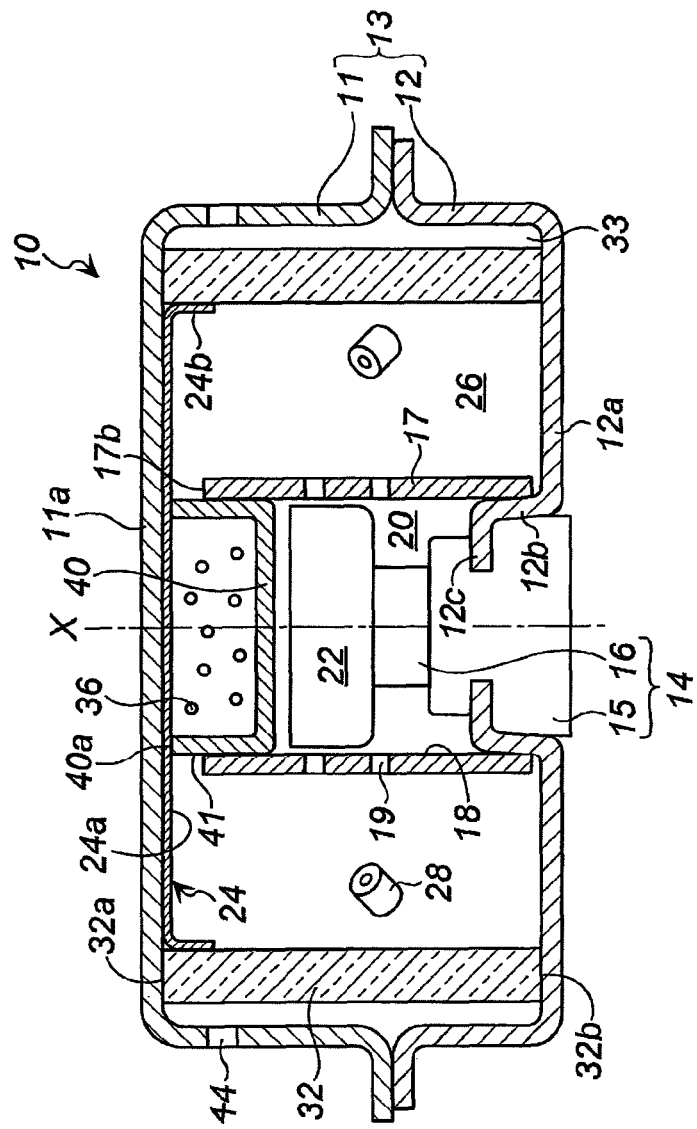
FIG. 2 shows an axial sectional view during activation of the gas generator shown in FIG. 1.

EMBODIMENTS OF THE INVENTION (1) Gas Generator Shown in FIGS. 1 and 2

FIG. 1 is an axial sectional view showing a state of a gas generator 10 according to the present invention before activation.

A housing 13 is formed by a diffuser shell 11 and a closure shell 12.

The diffuser shell 11 has a plurality of gas discharge ports 44 on a circumferential wall portion thereof and the gas discharge ports are closed from the inside by a known seal member (not shown in the drawing).

The closure shell 12 has, on a bottom portion 12a, a tubular portion 12b which is bent toward the inside of the housing 13 and an annular portion 12c that is bent radially inward from an upper end of the tubular portion 12b.

A known electric igniter 14 is mounted to a central hole formed by the annular portion 12c.

In the igniter 14, an igniter main body 16 is integrated with the closure shell 12 by a resin 15.

An inner tube member 17 is arranged at a central part inside the housing 13. The inner tube member 17 is provided such that a lower end portion 17a is press-fitted to the tubular portion 12b of the closure shell 12 and an upper end portion 17b is separated from a ceiling portion 11a of the diffuser shell 11.

A plurality of flame-transferring holes 19 is formed in a circumferential wall portion of the inner tube member 17 and are closed by a seal member (not shown in the drawing) before activation.

An ignition device chamber 20 is formed in a lower part (a side of the housing bottom portion 12a) inside the inner tube member 17. The igniter 14 is arranged in the ignition device chamber 20, and a transfer charge 22 filled into a pouch-like container is arranged on top of the igniter 14.

Boron niter, a gas generating agent with a high combustion temperature described in JP-A No. 2005-199867, and the like can be used as the transfer charge 22.

A space outside the inner tube member 17 is a combustion chamber 26 which is charged with a solid gas generating agent 28. For the gas generating agent 28, for example, a gas generating agent with a low combustion temperature described in JP-A No. 2005-199867 and the like can be used. As the solid gas generating agent 28, those with known shapes such as single perforated, multi-perforated, pellet, disk, block, and the like can be used.

An outer circumference of the combustion chamber 26 is enclosed by a tubular filter 32. An upper end portion 32a of the filter 32 abuts against the ceiling portion 11a of the diffuser shell 11 and a lower end portion 32b of the filter 32 abuts against the bottom portion 12a of the closure shell 12.

In addition, the filter 32 is arranged so that a gap 33 is formed between an outer circumferential surface thereof and the circumferential wall portion of the housing 13. By forming such a gap 33, a combustion gas produced in the combustion chamber 26 can pass through the entire portion of the filter 32 more easily and the filter 32 can be used effectively.

The filter 32 can be compressed at least in the X-axis direction and is arranged inside the housing 13 while being compressed in the X-axis direction by the diffuser shell 11 and the closure shell 12.

For the filter, a filter formed by bending and compression-molding wound wire rods such as that described in JP-A No. 10-119705 or a filter formed by winding a single wire rod a large number of times can be used.

A retainer 24 is arranged on an inner circumferential side of the upper end portion 32a of the filter 32. The retainer 24 includes a disk portion 24a that abuts against the ceiling portion 11a of the diffuser shell 11 and a tubular portion 24b that abuts against an inner circumferential side of the upper end portion 32a of the filter 32.

The retainer 24 covers a gap between the upper end portion 32a of the filter 32 and the ceiling portion 11a of the diffuser shell 11 to prevent short-passing in which combustion gas flows through the gap. Moreover, the retainer 24 may be omitted.

A cup-shaped container 40 that stores an adsorbent 36 is inserted, from its bottom portion side, on the side of the upper end portion 17b of the inner tube member 17. An outer circumferential wall surface 41 of the cup-shaped container 40 and an inner circumferential wall surface 18 of the inner tube member 17 partially (⅓ or more of the outer circumferential wall surface 41) directly oppose (contact with) each other.

From the perspectives of heat resistance and durability, the cup-shaped container is made of a metal such as aluminum, iron, and stainless steel. Moreover, alternatively, after placing the adsorbent in a so porous container as to hold the adsorbent therein, the porous container may be placed inside the cup-shaped container 40.

In the embodiment shown in FIG. 1, the cup-shaped container 40 is press-fitted into the inner tube member 17 and fixed by adjusting sizes of an inner diameter of the inner tube member 17 and an outer diameter of the cup-shaped container 40 (the aforementioned arrangement (II)).

In addition, an opening end portion 40a of the cup-shaped container 40 is arranged such that a gap wide enough to enable fluid communication of gas is formed between the opening end portion 40a and the retainer 24.

The size of the adsorbent 36 and the size of the gap are favorably adjusted so as to prevent the adsorbent 36 from spilling into the combustion chamber 26 from the gap. In the embodiment shown in FIG. 1, a gap of approximately 1 to 5 mm is favorably formed in regards to the size of the adsorbent 36.

Figure 3:
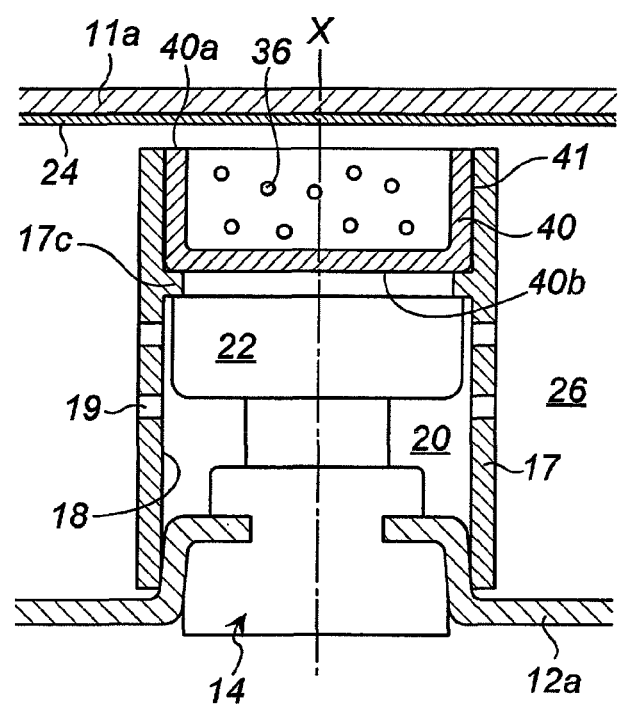
FIG. 3 shows an axial partial sectional view showing another embodiment of the gas generator shown in FIG. 1.

Instead of the arrangement of the embodiment (II) shown in FIG. 1, the cup-shaped container 40 can be arranged by the aforementioned arrangement (IV) shown in FIG. 3.

FIG. 3 shows an arrangement such that a bottom surface 40b of the cup-shaped member abuts against (is placed on) an annular protruding portion 17c formed on an inner circumferential wall of the inner tube member 17. The annular protruding portion 17c need not have a continuous annular shape as long as the cup-shaped member 40 can be arranged, and may have a discontinuous annular shape including a plurality of protrusions.

The outer circumferential wall surface 41 of the cup-shaped container 40 and the inner circumferential wall surface 18 of the inner tube member 17 entirely directly oppose (contact with) each other.

As the adsorbent 36, those described in paragraphs 0027 to 0029 in JP-A No. 2001-213688 can be used. Specifically, the following may be used.

One or a plurality of types among the following can be used in combination as the adsorbent: synthetic zeolite (molecular sieve), natural zeolite, activated alumina, silica gel, activated charcoal and clay (for example, Japanese acid clay, bentonite, diatomaceous earth, kaolin, and talc), a solid superacid such as sulfated zirconia, and a solid acid such as solid phosphoric acid, silica-alumina, and silica-magnesia, and the like. In particular, synthetic zeolite is favorable.

In a case of zeolite, while a spherical bead-type zeolite with a diameter of 0.5 mm to 2 mm is favorable, a pellet-type zeolite can also be used. Zeolite is known to adsorb moisture to a maximum of 20% by mass of its own weight, and is favorably added in a range of 1 to 30% by mass relative to the mass of a charged gas generating agent.

The adsorbent 36 may be stored directly in the cup-shaped container 40 or in a pouch being capable of fluidly communicating gas as well as retaining the adsorbent 36 (for example, a net pouch) may be filled with the adsorbent 36 and stored inside the cup-shaped container 40.

In addition, in order to increase an area of contact with gas, the adsorbent 36 may be fixed to a honeycomb supporting body or a grid-like supporting body.

Next, the function of the adsorbent before activation and an operation of the gas generator at activation will be described with reference to FIGS. 1 and 2 for the present invention.

<Before Activation>

Since a gap wide enough to enable fluid communication of gas is secured between the end portion 40a of the opening of the cup-shaped container 40 and the retainer 24, a gas inside the gas generator 10 (in particular, a gas inside the combustion chamber 26) passes through the gap and frequently comes into contact with the adsorbent 36 inside the cup-shaped container 40.

Since the gas discharge ports of the gas generator 10 are blocked by a seal member, penetration of humidity from the outside is prevented. However, it is conceivable that a tiny amount of moisture has already existed inside the gas generator 10 during a manufacturing process.

In addition, as described in JP-A No. 2001-213688, there is a possibility of various radical components and the like being generated from the solid gas generating agent 28 inside the sealed housing 13.

However, since the moisture, the radical components and the like are adsorbed and retained as the adsorbent 36 inside the cup-shaped container 40 and the gas inside the gas generator 10 frequently come into contact with each other, adverse effects to the solid gas generating agent 28 are prevented.

<After Activation>

When a sensor (not shown) detects an impact, a signal from the sensor causes an activation current to be sent to the igniter 14 and the igniter 14 is activated. Subsequently, the transfer charge 22 ignites to produce high-temperature flames and high-temperature combustion gas.

The high-temperature flames and gas blow out from the flame-transferring hole 19 to the combustion chamber 26 and cause ignition and combustion of the solid gas generating agent 28. Accordingly, the gas generating agent 28 burns and produces high-temperature, high-pressure combustion gas. The combustion gas passes through all areas of the filter 32 to be cooled and filtered, and blows out from the gas discharge ports 44.

At this point, since the cup-shaped container 40 storing the adsorbent 36 is inserted into the inner tube member 17 as described above, the impacts produced upon ignition of the igniter 14 and the transfer charge 22 are received by the bottom surface of the container 40, and the cup-shaped container 40 instantaneously moves up along the X-axis direction.

As a result, the end portion 40a of the opening of the cup-shaped container 40 which has been open until then collides with the retainer 24 (with the ceiling portion 11a of the diffuser shell 11 in case of not using the retainer 24) and closes, and communication between the inside of the cup-shaped container 40 and the combustion chamber 26 is blocked off.

Therefore, even if the adsorbent 36 is crushed by the impact of the aforementioned collision or the like, the crushed absorbent is prevented from spilling out from the cup-shaped container 40. In addition, the adsorbent 36 inside the cup-shaped container 40 and the high-temperature combustion gas are prevented from coming into contact with each other.

Moreover, as described above, since the combustion gas generated inside the combustion chamber 26 flows outward and is discharged from the gas discharge ports 44, a movement of the cup-shaped container 40 in the axial direction does not affect the discharging operation of the combustion gas.

Furthermore, even if the cup-shaped container 40, that has moved in the X-axis direction upon receiving the impact, moves, reversely, in the opposite or reverse direction after the impact, since the generation and discharge of the combustion gas have been completed at that point, no adverse effects are created.

(2) Gas Generator Shown in FIGS. 4(a) and 4(b)

A gas generator shown in FIGS. 4(a) and 4(b) is the same as the gas generator 10 shown in FIG. 1 except for the cup-shaped container 40 being replaced with a cup-shaped container 140.

The cup-shaped container 140 shown in FIG. 4(a) has a flange 142 that extends outward from a circumferential edge of an end portion of an opening (same as the end portion 40a of the opening shown in FIG. 1).

In addition, the cup-shaped container 140 is inserted to the inside of an inner tube member 17 in a state where the flange 142 abuts against an upper end portion 17b of the inner tube member 17 (the arrangement (V) described above).

Therefore, before activation, a gap is formed between the flange 142 and a retainer 24 to enable an adsorbent 36 inside the cup-shaped container 140 and a gas inside the gas generator to come into contact with each other. Before activation, the same advantage as the gas generator 10 shown in FIG. 1 may be obtained.

During activation of the gas generator, the cup-shaped container 140 moves from the state shown in FIG. 4(a) to the state shown in FIG. 4(b) to block the gap, and the same advantage as the gas generator 10 shown in FIG. 1 is obtained.

Figure 4:
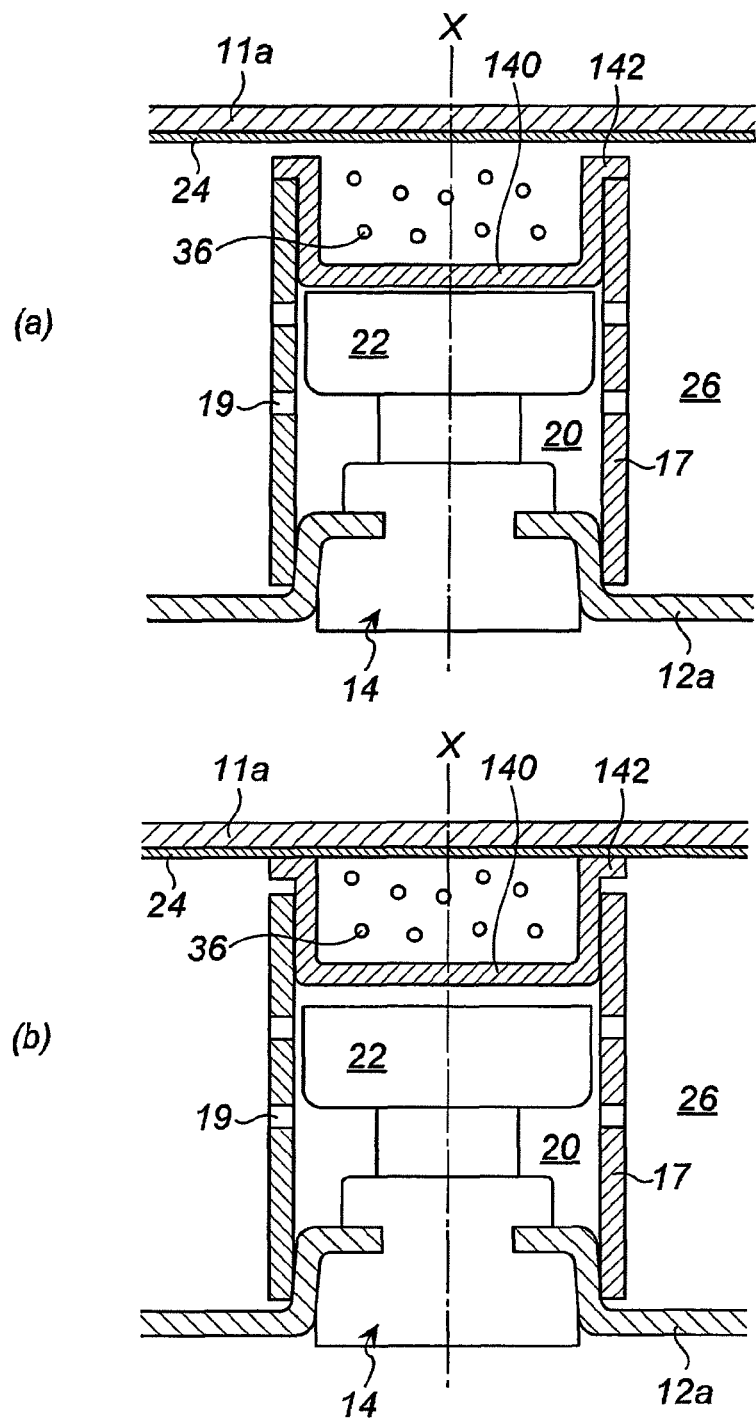
FIG. 4 shows, in (a), an axial partial sectional view showing yet another embodiment of FIG. 1 (before activation), and, in (b), an axial partial sectional view showing a state of (a) after activation.
Figure 5:
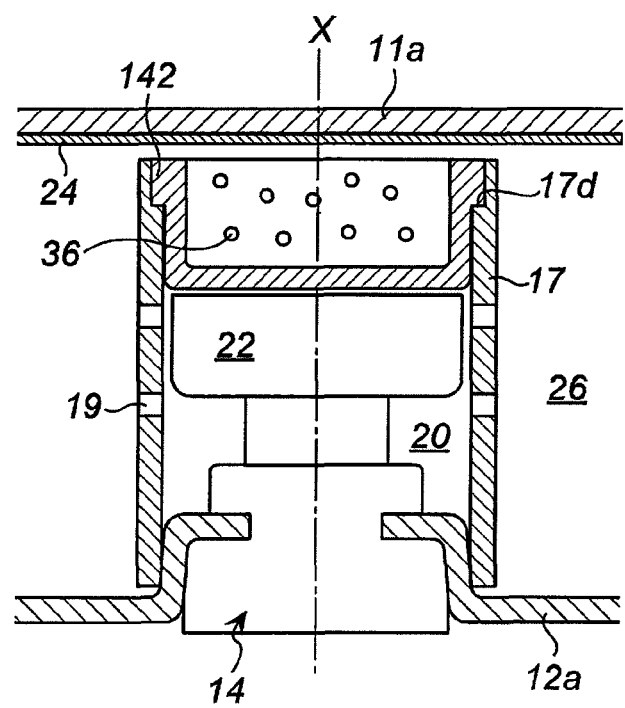
FIG. 5 shows an axial partial sectional view showing another embodiment of the gas generator shown in FIG. 4.

As an arrangement of the cup-shaped container 140 having the flange 142, the aforementioned arrangement (VI) shown in FIG. 5 can be applied in place of the arrangement shown in FIG. 4.

FIG. 5 shows an arrangement such that the flange 142 of the cup-shaped member abuts against an annular step portion 17d formed on an inner circumferential surface of the inner tube member 17.

The annular step portion 17d is an annularly provided step portion formed by difference in the inner diameter of the inner tube member 17 and the step portion need not have a continuous annular shape as long as the step portion can be abutted by the flange 142, and may have a discontinuous annular shape including a plurality of protrusions.

Figure 6:
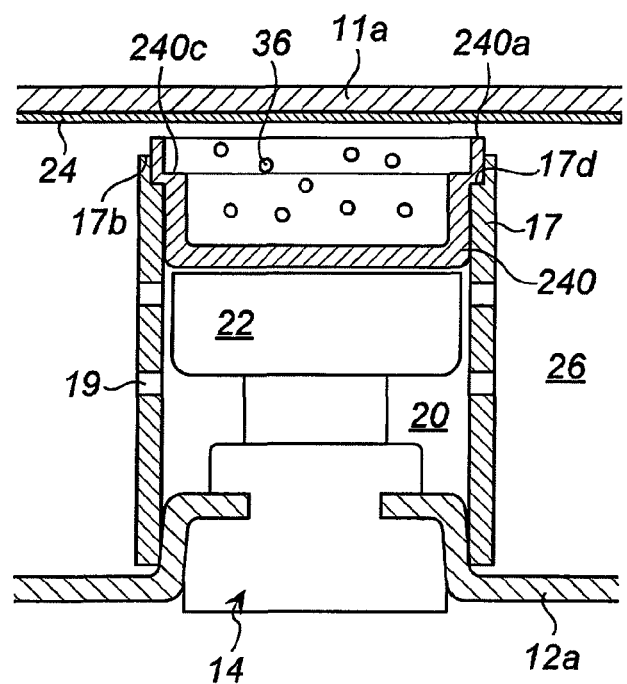
FIG. 6 shows an axial partial sectional view showing yet another embodiment of the gas generator according to the present invention.

(3) Gas Generator Shown in FIG. 6

A gas generator shown in FIG. 6 is the same as the gas generator 10 shown in FIG. 1 except for a shape of the inner tube member 17 being partially changed and the cup-shaped container 40 being replaced with a cup-shaped container 240. The cup-shaped container 240 is provided by the aforementioned arrangement (VII).

The inner tube member 17 is the same as that shown in FIG. 5 and has an annular step portion 17d formed on an inner circumferential surface thereof.

The cup-shaped container 240 shown in FIG. 6 has an annular step portion 240c on an inner circumferential surface in an opening portion side as well as an annular step portion formed on a corresponding outer circumferential surface.

The cup-shaped container 240 is provided such that an outer circumferential surface side of the annular step portion 240c abuts against the annular step portion 17d formed inside the inner tube member 17.

The annular step portion 240c of the cup-shaped container is a step portion formed by difference in the outer and inner diameters of the cup-shaped container 240.

Figure 7:
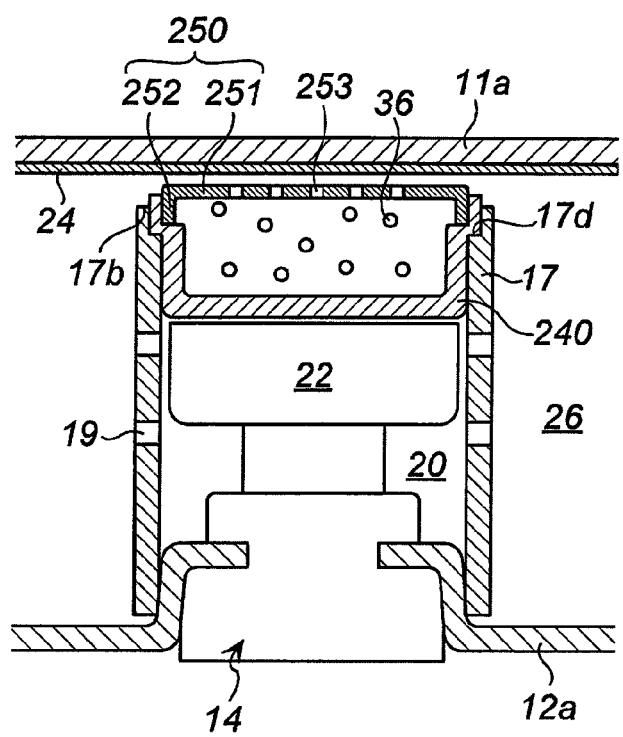
FIG. 7 shows an axial partial sectional view showing another embodiment of the gas generator shown in FIG. 6.

(4) Gas Generator Shown in FIG. 7

A gas generator shown in FIG. 7 further combines a lid portion 250 with the embodiment shown in FIG. 6.

The lid portion 250 has a circular bottom portion 251 and a circumferential wall portion 252, and a plurality of communication holes 253 that enables fluid-communication of gas is formed on the bottom portion 251. The size of the communication holes 253 is adjusted to prevent an adsorbent 36 from spilling out. The bottom portion 251 of the lid portion 250 may be made from a net.

In the lid portion 250, the circumferential wall portion 252 is press-fitted into an opening portion of a cup-shaped container 240 and a circumferential edge portion of the circumferential wall portion 252 abuts against an annular step portion 240c.

By combining the cup-shaped container 240 and the lid portion 250, a gap between the lid portion 250 and the ceiling portion 11a (the retainer 24) can be widened in comparison to the embodiments shown in FIGS. 1 to 6. Therefore, since gas can communicate more easily, contact between an adsorbent inside the cup-shaped container 240 and external gas (gas inside the combustion chamber 26) is promoted.

During activation of the embodiment shown in FIG. 7, as shown in FIGS. 4(a) and 4(b), the cup-shaped container 240 and the lid portion 250 collide with the ceiling portion 11a and the communication holes of the lid portion 250 are blocked.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining apparatus comprising:
   a housing having a gas discharge port;
   an inner tube member provided inside the housing;
   an ignition device arranged on a side of a bottom portion of the housing inside the inner tube member;
   a solid gas generating agent stored in a combustion chamber surrounding the inner tube member; and
   an adsorbent being arranged inside the housing, separated from the solid gas generating agent and stored in a cup-shaped container, the cup-shaped container being arranged such that a gap that enables a gas to fluidly communicate inside with outside of the cup-shaped container is formed between an opening portion of the cup-shaped container and a ceiling portion of the housing or a member arranged on the ceiling portion of the housing, and a bottom portion side of the cup-shaped container being inserted such that at least a part of an outer circumferential wall surface of the cup-shaped container directly opposes an inner circumferential wall surface of the inner tube member, wherein
   at activation of the gas generator, the cup-shaped container being moved by an impact generated by the ignition device and abutting against the ceiling portion of the housing or the member arranged on the ceiling portion of the housing to close the opening portion.

2. The gas generator for a restraining apparatus according to claim 1, wherein the cup-shaped container is arranged and inserted into the inner tube member such that an entirety of the outer circumferential wall surface of the cup-shaped container directly opposes the inner circumferential wall surface of the inner tube member.

3. The gas generator for a restraining apparatus according to claim 1, wherein the cup-shaped container comprises a flange portion at the opening portion, and the cup-shaped container is provided in the tube member such that the flange portion abuts against a circumferential edge portion on a side of the ceiling portion of the housing.

4. The gas generator for a restraining apparatus according to claim 1, wherein the cup-shaped container comprises a flange portion at the opening portion, and the cup-shaped container is provided such that the flange portion abuts against an annular step portion or an annular protruding portion formed inside the inner tube member.

5. The gas generator for a restraining apparatus according to claim 1, wherein the cup-shaped container comprises an annular step portion on a circumferential surface thereof, and the cup-shaped container is provided such that the annular step portion abuts against an annular step portion or an annular protruding portion formed inside the inner tube member.

6. The gas generator for a restraining apparatus according to claim 1, wherein the cup-shaped container is provided such that a bottom surface of the cup-shaped container abuts against an annular step portion or an annular protruding portion formed inside the inner tube member.

7. The gas generator for a restraining apparatus according to claim 1, wherein the opening portion of the cup-shaped container is covered by a lid portion having a plurality of communication holes that enables communication of a gas.

* * * * *